United States Patent [19]
Boldrini et al.

[11] Patent Number: 6,000,196
[45] Date of Patent: Dec. 14, 1999

[54] METHOD AND UNIT FOR FEEDING COLLARS FOR RIGID PACKETS OF CIGARETTES TO A CONTINUOUS PACKING LINE

[75] Inventors: Fulvio Boldrini, Ferrara; Giorgio Vaccari, Bologna, both of Italy

[73] Assignee: G.D Societa ' per Azioni, Bologna, Italy

[21] Appl. No.: 09/110,775

[22] Filed: Jul. 6, 1998

[30] Foreign Application Priority Data

Jul. 9, 1997 [IT] Italy .................................. BO97A0421

[51] Int. Cl.[6] ................................................. B65B 61/00
[52] U.S. Cl. .................................. 53/410; 53/415; 53/449; 53/135.1; 53/136.1; 53/170; 53/389.3; 53/389.4; 493/94; 493/911
[58] Field of Search .............................. 493/94, 359, 360, 493/911; 53/135.1, 136.1, 170, 234, 389.3, 389.4, 410, 415, 449

[56] References Cited

U.S. PATENT DOCUMENTS

| | | | |
|---|---|---|---|
| 3,802,325 | 4/1974 | Bardenhagen et al. | 53/170 X |
| 3,967,543 | 7/1976 | Seragnoli | 493/94 |
| 4,084,393 | 4/1978 | Focke | 53/136.4 |
| 4,612,756 | 9/1986 | Focke et al. | 53/234 X |
| 4,938,005 | 7/1990 | Focke | 53/410 |
| 5,035,102 | 7/1991 | Tomanovits | 53/397 |
| 5,066,270 | 11/1991 | Tomanovits | 493/295 X |
| 5,146,728 | 9/1992 | Knecht et al. | 53/234 X |
| 5,152,737 | 10/1992 | Wu et al. | 493/352 |
| 5,163,268 | 11/1992 | Vaccari et al. | 53/397 |
| 5,168,690 | 12/1992 | Quadvana | 53/234 X |
| 5,261,209 | 11/1993 | Focke et al. | 53/410 |
| 5,461,842 | 10/1995 | Brizzi et al. | 53/170 X |
| 5,657,609 | 8/1997 | Spada et al. | 53/176 X |
| 5,674,542 | 10/1997 | Focke et al. | 493/405 X |
| 5,782,736 | 7/1998 | Brizzi et al. | 493/84 X |

FOREIGN PATENT DOCUMENTS

| | | |
|---|---|---|
| 0082348 | 6/1983 | European Pat. Off. . |
| 0324160 | 7/1989 | European Pat. Off. . |
| 0691267 | 1/1996 | European Pat. Off. . |
| 0716016 | 6/1996 | European Pat. Off. . |
| 2238770 | 6/1991 | United Kingdom . |
| 2286377 | 8/1995 | United Kingdom . |

Primary Examiner—Daniel B. Moon
Attorney, Agent, or Firm—Marshall, O'Toole, Gerstein, Murray & Borun

[57] ABSTRACT

A method and unit for feeding collars for packets of cigarettes to a continuous packing line, whereby the collars, picked up successively and in steps by a transfer device, are transferred rapidly by the transfer device to a continuously-moving supply assembly, which feeds the collars successively to the packing line after squarely folding two lateral wings of each collar; the collars being fed on to the packing line with the lateral wings crosswise to a traveling direction of the line.

22 Claims, 2 Drawing Sheets on patent 6,000,196

METHOD AND UNIT FOR FEEDING COLLARS FOR RIGID PACKETS OF CIGARETTES TO A CONTINUOUS PACKING LINE

BACKGROUND OF THE INVENTION

The present invention relates to a method of feeding collars for rigid packets of cigarettes to a continuous packing line.

Machines for packing cigarettes in rigid packets are known to feature packing lines comprising a pocket conveyor for successively step-feeding groups of cigarettes, already enclosed in respective protective wrappings, in a traveling direction crosswise to the longitudinal axis of the cigarettes and through a collar supply station.

The collars are normally fed to the supply station by a supply unit comprising a supply assembly for receiving the collars in steps, folding the wings of each collar squarely with respect to a central panel of the collar, and successively feeding the folded collars in steps to the pocket conveyor, so that each collar is oriented with the wings facing a respective pocket and substantially perpendicular to the traveling direction of the pocket conveyor.

In an attempt to increase the output speed of packing machines, while at the same time reducing vibration and noise, the recent tendency is to replace step-operated with continuous packing lines.

SUMMARY OF THE INVENTION

It is an object of the present invention to provide a method of continuously feeding collars for packets of cigarettes to a continuous packing line.

According to the present invention, there is provided a method of feeding collars for rigid packets of cigarettes to a continuous packing line; each collar having a central panel, and two lateral wings on either side of the central panel with respect to a given longitudinal axis of the collar; and the method being characterized by comprising the steps of picking up the collars successively and in steps at a pickup station by means of a transfer device; rapidly transferring the collars, by means of said transfer device, to a continuously-moving supply assembly; and successively feeding the collars, by means of said supply assembly, to the packing line at a supply station, after first folding the lateral wings of each collar squarely with respect to the central panel; the collars being fed on to the packing line with the lateral wings crosswise to a traveling direction of the line.

The present invention also relates to a unit for feeding collars for packets of cigarettes to a continuous packing line.

According to the present invention, there is provided a unit for feeding collars for rigid packets of cigarettes to a continuous packing line; each collar having a central panel, and two lateral wings on either side of the central panel with respect to a given longitudinal axis of the collar; and the unit being characterized by comprising a continuously-moving supply assembly for successively feeding the collars to said line at a supply station; folding means carried by said supply assembly to fold said lateral wings of each collar crosswise to the central panel; and a transfer device for picking up said collars successively and in steps at a pickup station, and rapidly transferring the collars to said supply assembly; said supply assembly being so formed as to feed the collars to said line with the lateral wings crosswise to a traveling direction of the line.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
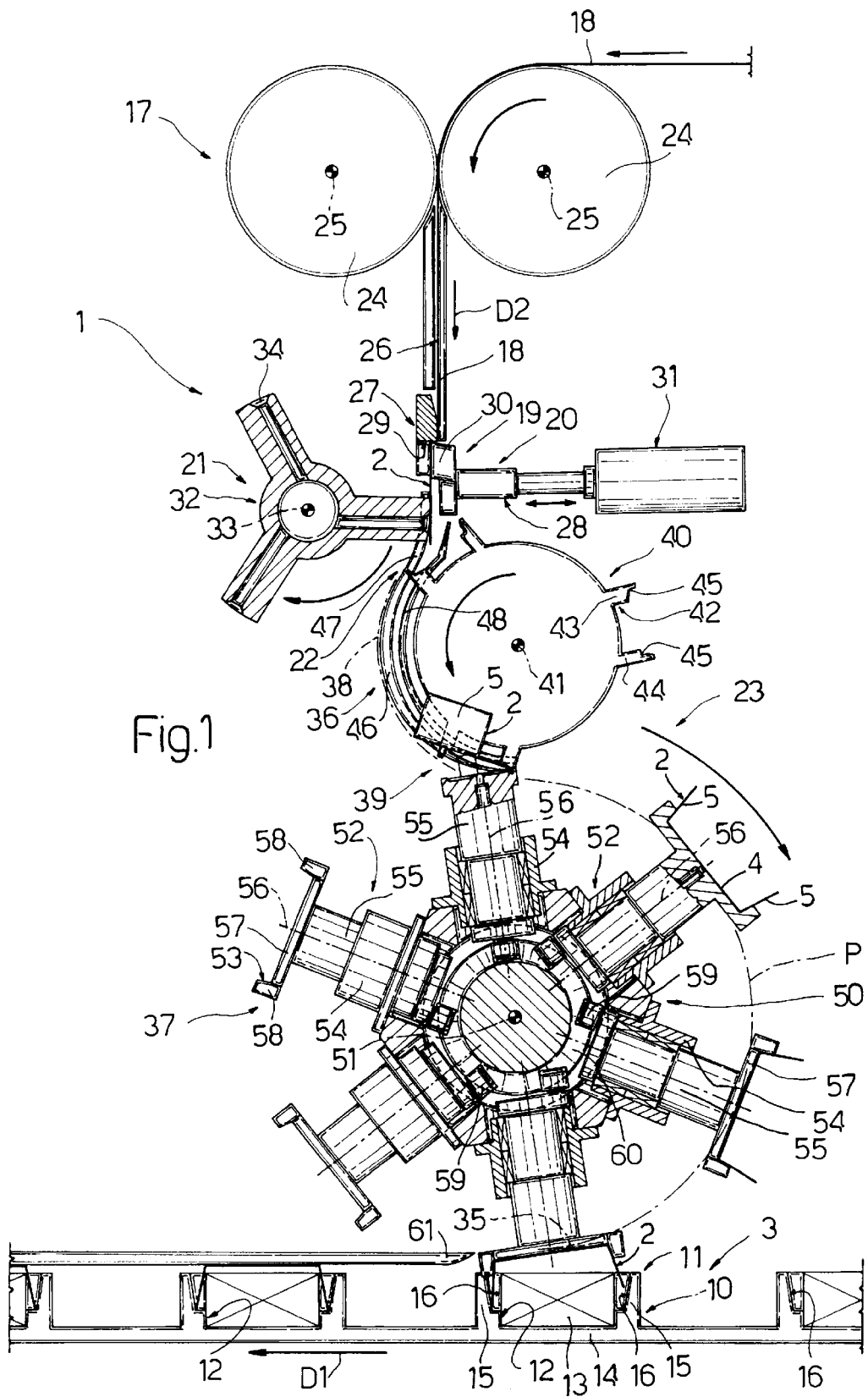
FIG. 1 shows a schematic side view, with parts in section and parts removed for clarity, of a preferred embodiment of the unit according to the present invention.
Figure 2:
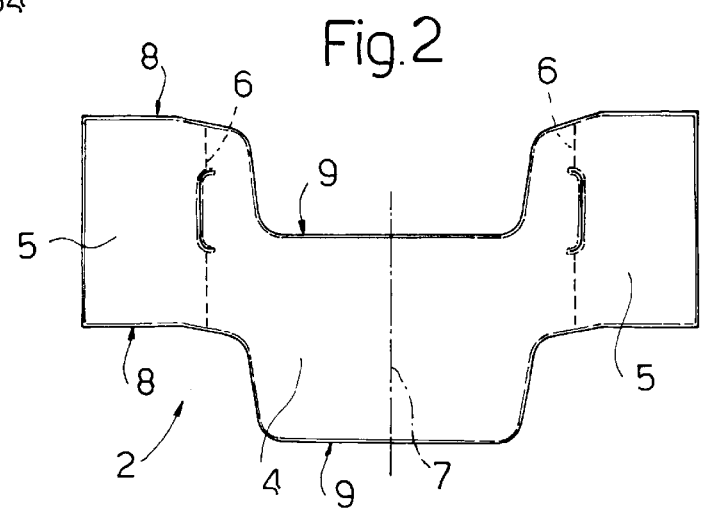
FIG. 2 shows a plan view of a collar for a packet of cigarettes.

Number 1 in FIG. 1 indicates a unit for feeding collars 2 for rigid packets of cigarettes (not shown) to a continuous packing line 3. Collars 2 are of the type normally used in the tobacco industry, and each comprise, as shown more clearly in FIG. 2, a central panel 4, and two lateral wings 5 on either side of panel 4 and connected to panel 4 along respective preformed bend lines 6 extending parallel to a longitudinal axis 7 of collar 2. Collar 2 is also defined longitudinally by two identical lateral edges 8, each having a substantially U-shaped central portion 9 extending crosswise to axis 7.

Line 3 comprises a pocket conveyor 10 movable continuously at a given speed V and in a packing direction D1 through a supply station 11 to receive collars 2, and which in turn comprises a number of conveying pockets 12, each for containing a respective group (not shown) of cigarettes enclosed in a wrapping 13 and defining the contents of a said packet of cigarettes (not shown), and a respective collar 2. Each pocket 12 comprises a bottom wall 14 integral with conveyor 10, and two lateral walls 15 extending perpendicularly to direction D1 and having respective grooves 16 for housing the free ends of respective wings 5 of the same collar 2.

Unit 1 comprises a supply device 17 for feeding a strip 18 of cardboard in steps and in a direction D2 to a cutting station 19; a cutting device 20 located at cutting station 19 to cut strip 18 into a succession of collars 2; a transfer device 21 for picking up each collar 2 individually from cutting station 19 and feeding it to a transfer station 22; and a supply assembly 23 for feeding collars 2 continuously from transfer station 22 to supply station 11, while at the same time, as explained in detail later on, folding wings 5 of collars 2 and so orienting collars 2 as to mate with pockets 12 of conveyor 10 at supply station Supply device 17 comprises two counter-rotating rollers 24—one powered and the other a pressure roller—mounted for rotation about respective axes 25 crosswise to the FIG. 1 plane to feed strip 18 in steps and in direction D2 to cutting station 19. In practice, device 17 feeds strip 18 along a conveying surface 26, which need not necessarily be perpendicular to packing direction D1, as in the FIG. 1 example, but which may be defined by one of a sheaf of planes (not shown) having a line of intersection (not shown) perpendicular to the FIG. 1 plane, i.e. parallel to the plane of conveyor 10 and perpendicular to direction D1.

Cutting device 20 comprises a block 27 and a cutting hammer 28 on either side of strip 18 at station 19. Block 27 is fixed, has a front face coplanar with surface 26 and having an end edge reproducing one of edges 8 of collar 2, and has two opposite lateral grooves 29 (only one shown in FIG. 1) along said end edge; while hammer 28 comprises a cutting head 30, which has a lateral edge complementary with the end edge of block 27, and which cooperates with block 27 to cut a collar 2 off strip 18 at each passage through cutting station 19. For which purpose, head 30 is moved by a linear actuator 31, in a direction perpendicular to conveying surface 26 and in time with the forward feed of strip 18, between a cutting position in which head 30 cuts strip 18 to form a collar 2, and a rest position in which head 30 is positioned facing surface 26 and on the opposite side of surface 26 to block 27.

Transfer device 21 comprises a drum 32 mounted for rotation about a respective axis 33 parallel to axes 25, and having a number of pairs of peripheral suction pickup heads 34 (only one of each pair shown), which are movable in steps with drum 32 along respective circular paths extending through grooves 29, to assume, cyclically, a loading position, at grooves 29, in which the heads 34 in each pair receive a respective collar 2 just cut off strip 18 by cutting head 30, and an unloading position in which the heads 34 in each pair feed respective collar 2 to supply assembly 23 at transfer station 22 at a traveling speed equal to speed V of conveyor 10.

Supply assembly 23 provides for feeding collars 2 continuously along a path P extending from transfer station 22 and having an output portion 35 tangent to direction D1 at station 11, and comprises a folding device 36 and an orienting device 37. Folding device 36 receives collars 2 at transfer station 22, feeds collars 2 along an initial portion 38 of path P extending up to a second transfer station 39, and transfers collars 2 to orienting device 37 at transfer station 39; while orienting device 37 feeds collars 2 along path P from transfer station 39 to supply station 11, to feed collars 2 into pockets 12 of conveyor 10.

Folding device 36 comprises a drum 40 mounted to rotate continuously, about an axis 41 parallel to axes 25, in a given direction (anticlockwise in FIG. 1) opposite the rotation direction of drum 32. Drum 40 in turn comprises a succession of peripheral conveying pockets 42, each of which receives a respective collar 2 with respective longitudinal axis 7 parallel to the traveling direction of drum 40, and is defined by a front wall 43 and a rear wall 44.

Figure 3:
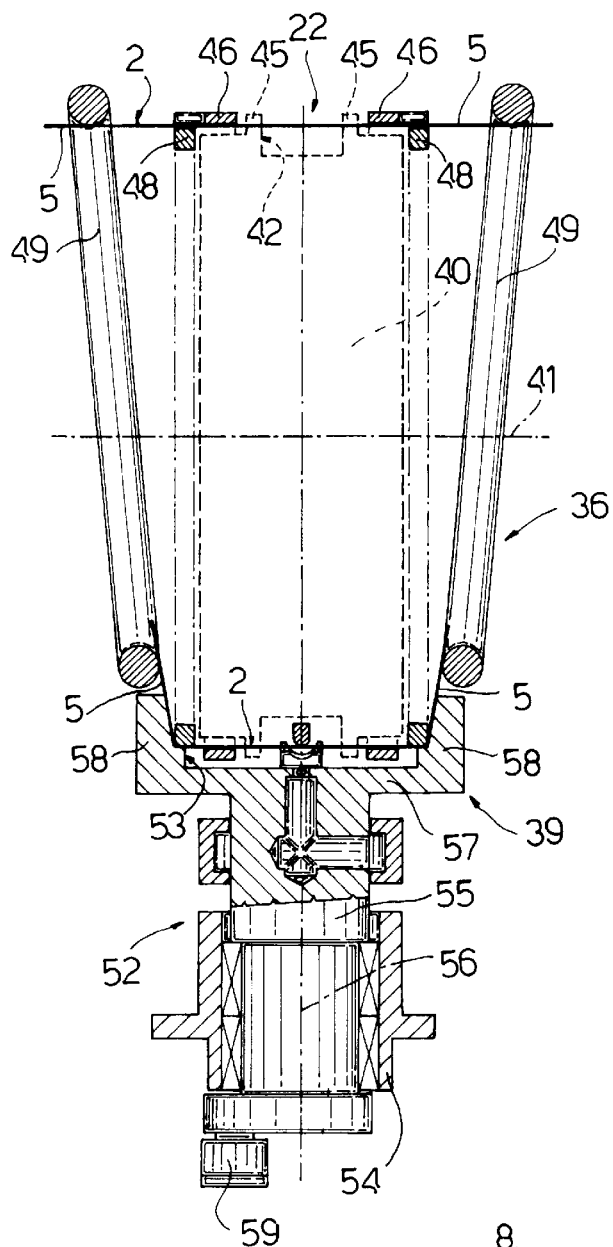
FIG. 3 shows a front view, with parts in section and parts removed for clarity, of a detail in FIG. 1.

As shown in FIG. 3, each wall 43, 44 is defined by a pair of radial teeth 45 located side by side in an axial direction with respect to drum 40 and inside the gap defined between two circumferential guides 46, which extend between cutting station 19 and transfer station 39 to engage the central panel 4 of each collar 2. Guides 46 comprise an input portion 47 extending between cutting station 19 and transfer station 22 in a substantially radial direction with respect to drum 40, and facing surface 26 and cutting head 30 to arrest each collar 2 as soon as it is cut off strip 18 by cutting head 30.

Each guide 46 contacts an outer surface of each collar 2, and is associated with a respective annular, substantially square-section guide 48 extending coaxially with axis 41, and which contacts an inner surface of each panel 4, in particular a portion of the inner surface extending along a respective preformed bend line 6 of panel 4.

As shown in FIG. 3, folding device 36 also comprises two fixed folding rings 49 located along axis 41, on either side of drum 40, and extending about axis 41 in respective planes, which converge with each other and with station 39, and are eccentric with respect to axis 41. More specifically, the portion of each ring 49 at transfer station 22 is substantially coplanar with respective guide 46, and engages the outer surface of a respective wing 5 close to the free end of wing 5. On the other hand, the portion of each ring 49 at station 39 extends, radially with respect to axis 41, well inside respective guide 48 and at a distance from guide 48 smaller than the length of respective wing 5, and extends, axially with respect to axis 41, just outside respective guide 48.

Each ring 49 engages, at station 22, a respective wing 5 of the same collar 2 in a respective pocket 42, and gradually folds wing 5 squarely as collar 2 is fed, in use, from station 22 to station 39.

Orienting device 37 comprises a drum 50 mounted for rotation in a given direction (clockwise in FIG. 1) about a respective axis 51 parallel to axis 41; and a number of peripheral orienting assemblies 52 carried by drum 50 and equally spaced about axis 51. Each assembly 52 comprises a respective substantially U-shaped conveying pocket 53 movable with drum 50 along output portion 35 of path P, and which travels cyclically through transfer station 39 to receive a collar 2 from a pocket 42 of folding device 36, and through supply station 11 to feed collar 2 on to conveyor 10.

Each pocket 53 is connected selectively to a suction chamber (not shown) so as to act as a suction pocket as it travels, in use, along output portion 35 of path P, and so retain a respective collar 2 by suction at station 39.

In addition to pocket 53, each orienting assembly 52 also comprises a fixed tubular body 54 extending radially outwards from drum 50; and a movable tubular body 55 fitted to body 54 so as to rotate about a respective axis 56 coaxial with body 54, and in turn fitted on the outer end with a respective pocket 53.

Each pocket 53 comprises a bottom wall 57 substantially perpendicular to axis 56 and which contacts panel 4 of collar 2; and two substantially parallel lateral walls 58 located on either side of wall 57 with respect to axis 56, and which slope slightly outwards with respect to a plane perpendicular to wall 57, and contact respect wings 5 of collar 2.

At the inner end opposite the end fitted with respective pocket 53, body 55 is fitted with an eccentric tappet 59 connected to a fixed central cam 60 coaxial with drum 50 and for swinging pocket 53, by 90° about respective axis 56, between a loading position, at station 39, in which the two walls 58 are positioned crosswise to axis 51, and an unloading position, at station 11, in which the two walls 58 are positioned parallel to axis 51.

Operation of unit 1 will now be described with reference to the supply of one collar 2 to continuous packing line 3, and as of the condition in which strip 18 is fed one step in direction D2 to cutting station 19; cutting head 30 is in the rest position; a pair of pickup heads 34 of transfer device 21 is in the loading position, i.e. facing cutting head 30; conveyor 10 is traveling in direction D1 at speed V; and drums 40 and 50 rotate about about respective axes 41 and 51 at tangential speeds equal to speed V.

Actuator 31 moves cutting head 30 into the cutting position to cut off strip 18 a collar 2 with respective axis 7 crosswise to axes 41 and 51. Pickup heads 34 then engage wings 5 of collar 2 by suction, and drum 32 rotates about axis 33 so that collar 2 is accelerated by heads 34 and fed at speed V through transfer station 22, where collar 2 is positioned with panel 4 interposed between guides 46 and 48, and with wings 5 beneath rings 49.

Simultaneously with the arrival of collar 2 at station 22, a conveying pocket 42 of folding device 36 is fed through station 22 at tangential speed V and in time with collar 2, and respective pairs of teeth 45 engage portions 9 of collar 2 to remove collar 2 from heads 34 by which collar 2 ceases to be retained by suction. Once collar 2 is released, heads 34 continue rotating with drum 32, and are arrested when a further pair of heads 34, traveling through grooves 29 of block 27, is positioned at cutting station 19 to pick up, by suction, the next collar 2 cut off strip 18.

It should be noted that, at station 22, axis 7 of collar 2 is oriented in a direction tangent to the surface of drum 40 and crosswise to axis 41.

Collar 2 is fed along initial portion 38 of path P with axis 7 parallel to traveling speed V, and wings 5 are gradually folded squarely by rings 49 about preformed bend lines 6 and on to the outer axial surfaces of respective guides 48.

Collar 2 is fed to transfer station 39 in time with a pocket 53, which is set to the loading position, travels at speed V through station 39, and is gradually engaged by collar 2, which is fed into pocket 53 with panel 4 contacting bottom wall 57, and with wings 5 contacting respective lateral walls 58 of pocket 53.

Pocket 53 retains collar 2 by suction, and feeds it at speed V along output portion 35 of path P to supply station 11. As it travels along portion 35, pocket 53 is rotated 90° about respective axis 56 by cam 60, so as to move into the unloading position, i.e. with lateral walls 58 parallel to axis 51, prior to reaching station 11. Collar 2 is fed by pocket 53 to supply station 11 in time with the passage, through station 11, of a pocket 12 of conveyor 10, so that the longitudinal extension of wings 5, parallel to bend lines 6, is crosswise to direction D1.

As it travels through supply station 11, pocket 53 ceases to retain collar 2 by suction, and panel 4 contacts a plate 61 (FIG. 1), which detaches collar 2 from pocket 53 and simultaneously feeds collar 2 into pocket 12 of conveyor 10. It should be noted that collar 2 is positioned inside pocket 12 with wings 5 folded substantially squarely with respect to panel 4 and housed inside respective grooves 16 of pocket 12.

We claim:

1. A method of feeding collars for rigid packets of cigarettes to a continuous packing line; each collar having a central panel, and two lateral wings on either side of the central panel with respect to a given longitudinal axis of the collar; and the method being characterized by comprising the steps of picking up the collars successively and in steps at a pickup station by means of a transfer device; rapidly transferring the collars, by means of said transfer device, to a continuously-moving supply assembly; and successively feeding the collars, by means of said supply assembly, to the packing line at a supply station, after first folding the lateral wings of each collar squarely with respect to the central panel; the collars being fed on to the packing line with the lateral wings crosswise to a traveling direction (D1) of the line.

2. A method as claimed in claim 1, characterized by comprising the further steps of feeding in steps to a cutting station a strip of material suitable for forming the collars; and successively forming the collars from said strip at the cutting station.

3. A method as claimed in claim 2, characterized in that said transfer device picks up each collar at said cutting station, which defines said pickup station.

4. A method as claimed in claim 1, characterized in that said transfer device picks up each collar and transfers it, at a speed equal to a traveling speed of the packing line, to said supply assembly at a first transfer station; the supply assembly feeding each collar continuously at said speed along a path extending from the first transfer station and having an end portion tangent to the packing line at said supply station.

5. A method as claimed in claim 1, characterized in that, at said pickup station, each collar lies in a plane coplanar with one of a sheaf of planes having a line of intersection crosswise to said packing line.

6. A method as claimed in claim 5, characterized in that said plane is crosswise to the packing line.

7. A method as claimed in claim 1, characterized in that said packing line comprises a succession of pockets movable at a given speed and in a given direction through said supply station; each collar being fed to the supply station in time with the passage of a said pocket through the supply station.

8. A method as claimed in claim 1, characterized in that said supply assembly comprises a succession of first conveying seats movable cyclically between said first transfer station and a second transfer station at a given speed equal to a traveling speed of said packing line; each collar being fed by said transfer device to said first transfer station in time with a said first conveying seat and at said given speed.

9. A method as claimed in claim 8, characterized in that said wings of each collar are gradually folded squarely with respect to the central panel as the collar is fed between said two transfer stations; each folded said wing being parallel to a traveling direction of the collar between said two transfer stations.

10. A method as claimed in claim 9, characterized in that said collars are fed along said path, an initial portion of which, between said two transfer stations, is substantially circular and extends about a first axis crosswise to said packing line; the wings of each collar being folded squarely as the collar is fed along said initial portion.

11. A method as claimed in claim 10, characterized in that said supply assembly comprises a number of second conveying seats movable cyclically along the path from said second transfer station to said supply station; each of said second conveying seats receiving a collar from a respective said first conveying seat at said second transfer station, to which said first and second conveying seats are fed in time with each other and at the same said given speed.

12. A method as claimed in claim 11, characterized in that each collar reaches said second transfer station with a respective longitudinal axis tangent to said path, and reaches said supply station with the respective longitudinal axis crosswise to said path; each said second seat rotating the respective collar 90° about an axis perpendicular to the central panel of the collar.

13. A method as claimed in claim 12, characterized in that, between the second transfer station and the supply station, the path comprises a substantially circular second portion extending about a second axis parallel to said first axis.

14. A unit for feeding collars for rigid packets of cigarettes to a continuous packing line; each collar having a central panel, and two lateral wings on either side of the central panel with respect to a given longitudinal axis of the collar; and the unit being characterized by comprising a continuously-moving supply assembly for successively feeding the collars to said line at a supply station; folding means carried by said supply assembly to fold said lateral wings of each collar crosswise to the central panel; and a transfer device for picking up said collars successively and in steps at a pickup station, and rapidly transferring the collars to said supply assembly; said supply assembly being so formed as to feed the collars to said line with the lateral wings crosswise to a traveling direction of the line.

15. A unit as claimed in claim 14, characterized by comprising cutting means located at a cutting station to cut a continuous strip into said collars; and supply means for feeding said strip in steps to the cutting station.

16. A unit as claimed in claim 15, characterized in that said transfer device is a powered device movable through said cutting station, which is a pickup station at which said collars are picked up by said transfer device.

17. A unit as claimed in claim 14, characterized in that said transfer device is movable through a first transfer station to transfer each collar to said supply assembly at a speed equal to a traveling speed of said line; the supply assembly successively feeding the collars continuously at said speed along a path extending from the first transfer station and having an end portion tangent to said line at said supply station.

18. A unit as claimed in claim 17, characterized in that said supply assembly comprises first conveying means for feeding the collars continuously along an initial portion of said path; said initial portion extending from the first transfer station to a second transfer station upstream from the supply station along said path; said first conveying means comprising a succession of first conveying seats, each of which is movable through the first transfer station and said second transfer station at said speed, and receives a respective collar at the first transfer station to feed the collar to the second transfer station.

19. A unit as claimed in claim 18, characterized in that said supply assembly comprises second conveying means for feeding the collars along said path from the second transfer station to the supply station; said second conveying means comprising a number of second conveying seats movable along the path through the second transfer station and the supply station; each said second conveying seat being substantially U-shaped to receive a respective collar with the wings folded squarely, and rotating about a respective axis; and actuating means being provided to rotate each said second seat 90° about said axis as the second seat travels between the second transfer station and the supply station.

20. A unit as claimed in claim 14, characterized in that supply means are so oriented that said pickup station is supplied with each collar lying in a plane coplanar with one of a sheaf of planes having a line of intersection crosswise to said packing line.

21. A unit as claimed in claim 20, characterized in that said plane is crosswise to said direction.

22. A unit as claimed in claim 14, characterized in that said transfer device comprises a drum rotating in steps about a respective axis crosswise to said direction; said drum comprising pickup means for successively engaging said collars; and said pickup means being movable with the drum through a cutting station and a first transfer station, engaging respective said collars by suction at said cutting station, and transferring the collars to the first transfer station.

* * * * *